United States Patent [19]

Senanayake

[11] Patent Number: 5,608,268

[45] Date of Patent: Mar. 4, 1997

[54] SOLAR CHIMNEY ARRANGEMENT WITH A LIQUID FILLED NON-EVAPORATIVE AREA USED TO PRE-HEAT A LIQUID FILLED EVAPORATIVE AREA

[76] Inventor: Daya R. Senanayake, 9 Eorin Place, Colombo 8, Sri Lanka

[21] Appl. No.: 338,583

[22] PCT Filed: Mar. 11, 1994

[86] PCT No.: PCT/IB94/00038

§ 371 Date: Nov. 14, 1994

§ 102(e) Date: Nov. 14, 1994

[87] PCT Pub. No.: WO94/20752

PCT Pub. Date: Sep. 15, 1994

[51] Int. Cl.⁶ .................................................. F03G 6/00
[52] U.S. Cl. ........................................... 290/54; 60/641.12
[58] Field of Search .......................... 60/641.11, 641.12, 60/641.8, 641.9; 290/1 R, 54, 55; 415/909

[56] References Cited

U.S. PATENT DOCUMENTS

| 3,894,393 | 7/1975 | Carlson | 60/641.1 |
|---|---|---|---|
| 3,970,525 | 7/1976 | Kurek | 202/174 |
| 4,063,419 | 12/1977 | Garrett | 60/641.8 |
| 4,091,800 | 5/1978 | Fletcher et al. | 126/567 |
| 4,159,629 | 7/1979 | Korr et al. | 60/641.15 |
| 4,180,057 | 12/1979 | Ward | 126/675 |
| 4,452,046 | 6/1984 | Valentin | 60/641.11 |
| 4,480,632 | 11/1984 | Klier et al. | 126/625 |
| 4,856,281 | 8/1989 | Taylor | 60/641.9 |

FOREIGN PATENT DOCUMENTS

| 2307982 | 12/1976 | France . |
|---|---|---|
| 2436268 | 5/1980 | France . |
| 2531753 | 2/1984 | France . |
| 2931249 | 5/1981 | Germany . |
| 3401833 | 7/1985 | Germany . |
| 4036658 | 1/1992 | Germany . |

Primary Examiner—Steven L. Stephan
Assistant Examiner—Christopher Cuneo
Attorney, Agent, or Firm—Steven J. Hultquist

[57] ABSTRACT

A solar chimney assembly including a chimney (1) for receiving fluid from a solar heat collector (6, 7), and a turbine (2) driven by the fluid. The solar heat collector, which increases the moisture content and the temperature of the air flowing past the turbine, has an evaporative area (6) and a non-evaporative area (7). The non-evaporative area acts as a heat absorbing area and has a first cover (8) which inhibits evaporation of a heat-absorbing liquid retained therein. The evaporative area has a second cover (4) connected to the chimney and arranged to contain vapor evaporating from a liquid in the evaporative area. The assembly is constructed to transfer thermal energy from the liquid of the non-evaporative area to liquid of the evaporative area, for high efficiency operation.

11 Claims, 2 Drawing Sheets

SOLAR CHIMNEY ARRANGEMENT WITH A LIQUID FILLED NON-EVAPORATIVE AREA USED TO PRE-HEAT A LIQUID FILLED EVAPORATIVE AREA

FIELD OF THE INVENTION

This invention relates to a solar chimney arrangement.

BACKGROUND TO THE INVENTION

A solar chimney arrangement typically includes a solar chimney having an associated wind turbine, the wind turbine being energised in response to an updraft of solar-heated air in the chimney. Such an arrangement can be environmentally friendly.

DESCRIPTION OF THE PRIOR ART

In a known form of solar chimney, the air for use in the updraft is solar-heated beneath a glass collector roof. To obtain a volume of heated air sufficient to effect sustained operation of a wind turbine of a size suitable for the commercial generation of electricity, the collector roof needs to cover a large land area, and is of a construction both expensive to erect and costly to maintain.

French patent 2,307,982 shows a chimney carrying a turbine, the chimney being surrounded by an annular pool which is covered by a transparent plastic sheet preventing evaporation. Surrounding the pool is a slab of black-painted concrete. The pool and concrete are covered by a glass canopy. During periods of sunlight the glass canopy permits the concrete slab to heat up, and this in turn heats the air above, which flows into the chimney. The pool serves as a heat sink, storing heat during sunlight hours and giving out this heat during the night.

French patent 2,436,268 shows a chimney having a solar panel around its base, to form an air-heating chamber, whereby the air circulates normally i.e by natural in-draught from the outside to the inside of the container, to rise in the chimney stack.

U.S. Pat. No. 4,452,046 shows a tower, to which is connected at least one separate "hydric hothouse". Each hydric hothouse has a black (thermally absorbent) base covered by a transparent surface providing a membrane sheet over water. The hot air from above the water in each hothouse is sent through a pipe to the chimney installation.

STATEMENT OF THE INVENTION

It is the object of this invention to improve upon the efficiency of the known solar collection systems, by increasing the temperature and moisture content of the air flowing to the turbine.

From one aspect of the invention we now propose a solar chimney arrangement which includes air heating means comprising a liquid solar-heat absorber.

From another aspect of the invention we propose a solar chimney arrangement in which a solar chimney is associated with a non-evaporative area and an evaporative area, the non-evaporative area having a first cover adapted to inhibit evaporation of heat-absorbing liquid, the evaporative area having a second cover adapted to contain evaporated vapour, and means connecting the second cover with the solar chimney upstream of a wind turbine.

Preferably the evaporative and non-evaporative areas surround the chimney.

Usefully the evaporative areas are provided by ground pans filled with water, and separated into non-evaporative and evaporative areas. The non-evaporative areas are positioned to receive energy from the sun, and this energy is absorbed as heat in the liquid, some or all of that absorbed heat being then transferred to the water in the evaporative area.

The quantity of heat absorbed by the liquid can be enhanced by supplementing the "direct" absorbtion of solar energy by the liquid, as by "indirect" absorbtion. Usefully therefore the liquid is contained in a tank made from one or more heat absorbing materials. In one embodiment a ground pan is constructed by digging an earth trench which is then lined with black polythene sheet, the sheet acting both to contain the liquid e.g. water, and to absorb the sun's rays to become heated thereby.

The cover for the non-evaporative area preferably floats on the liquid e.g. water, surface and so is in direct contact therewith. The cover for the evaporative area is positioned above the liquid e.g. water, surface so that there is an evaporation space between the liquid and second cover. In a preferred embodiment the second cover is of a material such as glass, able to permit differential transmission therethrough of radiation whereby to permit the receipt of solar energy by the evaporative liquid but to inhibit loss of the resulting heat energy therethrough; the glazing can be of single thickness or of the multi-pane sealed type.

The second cover will usefully be arranged to extend beyond i.e. overhang the evaporative area whereby to permit air to be indrawn, to replace that flowing to the solar chimney; in an alternative embodiment a pump or similar one-way air flow means can alternatively be used to provide air to be heated.

The air to be fed for upward flow in the chimney from the evaporation space is thus both hotter than the external air and of reduced density, with enhanced flow characteristics.

The pans can be of large area, and shallow. In a typical installation, the collector roof area or second cover will be positioned completely around the chimney, and the ground pans will be outwardly thereof; though, if space is limited, the ground solar chimney will preferably be positioned away from the centre of the site at a position selected so that the ground pans are between the chimney and the sun's position e.g. at noon on a particular day. In one arrangement of the invention, the solar heat collector is adapted to increase the moisture content of the air above the evaporative area by at least 2%, and to increase the temperature of this air by at least 3° C., over that of surrounding ambient air.

BRIEF DESCRIPTION OF THE DRAWINGS

The invention will be further described, by way of example, with reference to the accompanying drawing, in which.

DETAILED DESCRIPTION OF THE EXEMPLARY EMBODIMENTS

Figure 1:
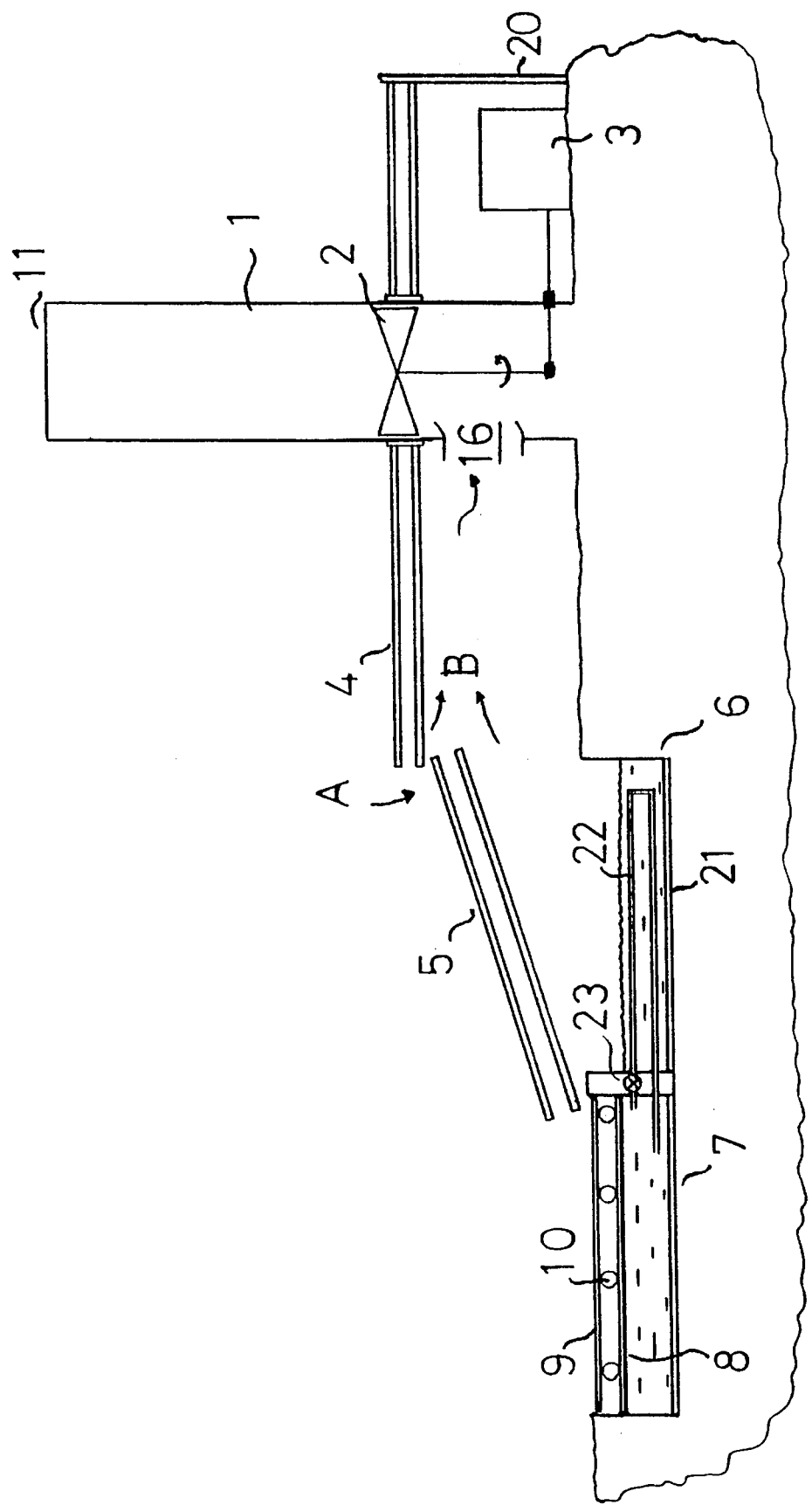
FIG. 1 is a side view, partly in section, of an embodiment of solar chimney arrangement according to the invention.

A vertical tube or chimney 1 is constructed in the centre of land area. In this embodiment, within the chimney 1 is constructed a wind fan 2, which can be rotated by updraft of air in chimney 1 to operate generator 3 to produce electricity. In an alternative embodiment, the electrical generator is located within the base of the chimney.

A primary collector roof 4, in this embodiment of glass, but in alternative embodiments of plastic or polymeric materials, e.g., KEVLAR® polymer, polyvinylchloride (PVC) or the like, is constructed around the chimney 1. As drawn, roof 4 is of the double-glazing type, but it can be of the triple-glazed type for extra protection against heat loss.

Roof 4 is mounted on steel struts 20, only one of which is shown, but in an alternative embodiment, of concrete, wooden, or plastic struts, to stand between 0.5 m and up to 200 m above ground level, the height being selected to be less than that of chimney 1.

The roof 4 closely surrounds chimney 1 in order to prevent the loss of heated air (provided as more fully described below), from between the roof and the chimney. Roof 4 extends outwardly from the chimney for a short distance selected in accordance with the requirements of the project designer, and ground terrain.

In this embodiment a secondary collector roof 5 is also provided, outwards from the periphery of primary roof 4. Second collector roof 5 is constructed at a lower level, in this embodiment being inclined and terminating just below the roof 4, but in another embodiment the second roof is at half the height of roof 4. Second collector roof 5 is fitted under roof 4 in order to provide a minimum primary roof overhang necessary to avoid direct outflow of air from under roof 4, in this embodiment of 3 m. The second collector roof 5 is similarly constructed of a transparent material, preferably glass but alternatively of KEVLAR® polymer or the like, and is again mounted on struts of a suitable material, such as concrete, wood or steel. The gap between the primary and secondary roofs permits ambient air to be drawn under collector roof 4, as shown by arrow A, thenceforth to pass through opening 16 into the chimney "upstream" of wind fan 2. In a further alternative embodiment the primary roof can be suitably shaped, usefully with openings arranged for the inflow of ambient air.

Below the second collector roof 5, and in this embodiment slightly below ground level, there is an evaporation pan 6. Whilst in one embodiment pan 6 can be an integral pan of plastics or the like, in a useful embodiment it is provided by shallow trenches cut from the earth, preferably to a depth of 2.5 cm–15 cm. Each pan or trench bottom 6 is covered by non-porous material 21 having solar-absorbent properties, in this embodiment black polythene. The pan can be of unitary construction but for ease of manufacture and installation will usually comprise several units, which may be hydraulically interconnected, or independent units.

In use, the polythene 21 in pan 6 is covered with water, which can become heated both by direct absorbtion of the energy from the sun's rays and indirectly by heat transfer from polythene 21, and can evaporate, to mix at or near position B with the air inflowing under the roof 4 overhang. Thus pan 6 provides an evaporative area and depending upon the solar heat absorbtion perhaps also a secondary heat absorbtion area.

As more fully described below, the water in evaporation pan 6 can be pre-heated by water in a pre-heating pan 7, which is the primary, perhaps only, heat absorbtion area. Pan 7 may be fabricated, and be of unitary (integral) construction though it is preferably assembled from multiple units. Usefully however it comprises a series of shallow trenches cut from the earth to a depth of 2.5 cm–15 cm, with laid sheets of black polythene to prevent water leakage, and filled with water.

As compared however with the arrangement for evaporative pan 6, the water in non-evaporative pan 7 is covered by an evaporation inhibiting sheet 8, preferably a sheet which floats directly on top of the water and is in intimate contact therewith. The sheet allows passage of the sun's rays, being in this embodiment a transparent sheet of polythene.

In a preferred embodiment, as disclosed, a second solar transmitting but insulating sheet 9, consisting of a layer of polythene, is held raised above the non-evaporation sheet 8, being separated therefrom by inflated balls 10 which rest on the non-evaporation sheet.

In alternative embodiments, the inflated balls are replaced by rigid foam or styro-foam balls, or the second insulating sheet is otherwise supported, as by struts or ropes, for the same purpose.

Although the water in pan 7 can be heated, because of the covering 8 it cannot evaporate and escape. Excess heat energy of the pan 7 water following solar absorbtion is, however, transferred to the water in evaporation pan 6, preferably indirectly by heat exchanger tubes 22 utilising pump 23; the evaporant is then replaced by fresh water added to pan 6. In an alternative embodiment the pan 7 water heats the pan 6 water directly as by simply being pumped thereinto (with the water level in pan 6 being maintained by the rate of pumping or by the use of a second, return, pump not shown) or being allowed to flow thereinto by gravity. In this second embodiment the evaporant is replaced by fresh water added to pan 7.

In use, solar energy falls upon the pans and roof, heating the water in evaporation pan 6 and the air under the two roofs. As air from under roof 4 is drawn up chimney 1, it is replaced by ambient air as shown by arrow A, which when under roof 4 becomes heated above the ambient temperature and takes up water vapour evaporated from pan 6, before passing through opening 16 to chimney 1 as vapour-laden low-density heated air. This air exits from the chimney top 1 so driving the fans 2 as it flows therepast.

The evaporation pans 6 thus permit the transfer of the collected solar heat in non-evaporation pans 7 to the air below roof 4, in the form of heat and vapour. The disposition of the second collector roof 5 relative to primary collector roof 4 permits the mixing of large volumes of ambient air with the heated vapour-laden air rising from evaporation pan or pans 6.

It will be understood that the costs of construction of a solar chimney of predetermined output can be substantially reduced, because much of the heat collector area is provided by shallow earth trenches and relatively inexpensive polythene or the like. Maintenance costs are also likely to be reduced.

In an alternative embodiment suitable perhaps for locations with strong and varying-direction winds the inflow of replacement air can be supplemented or effected by pumps, preferably driven by electrical energy produced by the turbine/generator.

The turbine and generator will desirably be selected to be of a size to generate electrical power for supply to the national grid, but alternatively can be for local supply as to individual industrial units.

For some installations, with limited available ground area, pan 6 could be positioned wholly or partly under roof 4; secondary roof 5 may then not be provided.

The air inflow can alternatively be drawn under secondary roof 5, from immediately above pan 7.

The pre-heating pan (or pans) 7 and the evaporation pan or pans 6 combine to provide an increase in the moisture content of the air flowing into the chimney 1, preferably by at least 2% over that of the surrounding ambient air.

These pans also combine to provide an increase in the temperature of the air flowing into the chimney 1, preferably by at least 3° C. above that of the surrounding ambient air.

In another embodiment the water from pre-heating pan 7 is sprayed into the evaporation area above pan 6. It may be sprayed (atomised) in the direction of flow of the wind (for rapid evaporation), or into or across the direction of flow, also to assist the vapourisation of the pre-heated water.

Figure 2:
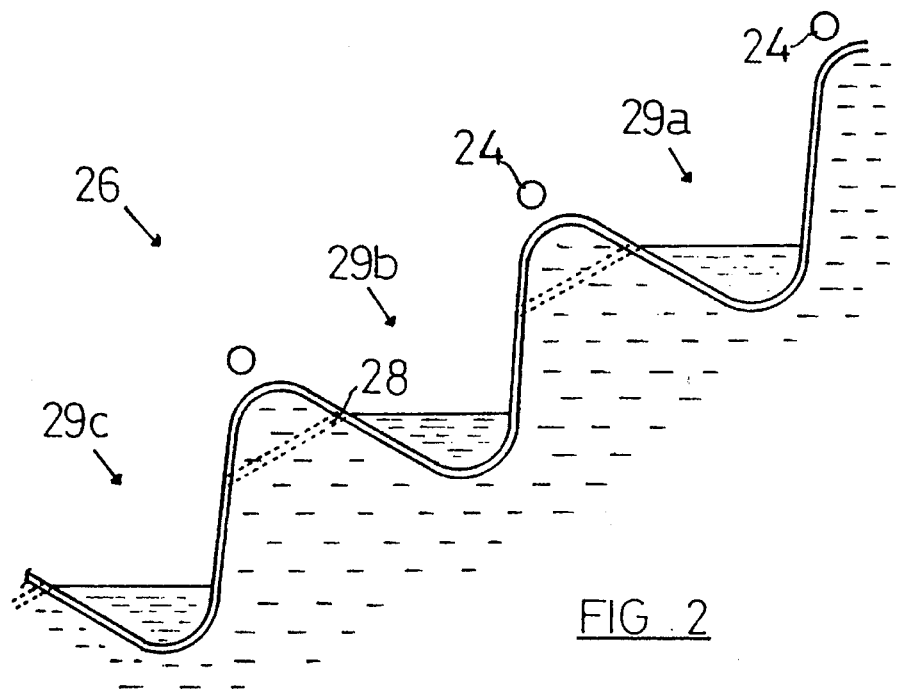
FIG. 2 is a partial side sectional view of an alternative evaporation pan.

In the embodiment of FIG. 2, pan 26 is of corrugated or wavy configuration, with water-retention canals 29a,29b, 29c, of large surface area for enhanced evaporation. Usefully the pan 26 is solid, of pyramid form but with upwardly facing external canals. In an alternative embodiment (such as that of FIG. 3) it can have a hollow interior e.g. for housing solar chimney equipment such as pump 30.

Although in this embodiment as installed the canals are horizontal, the pan 26 is angled and with a lower level outer side (than that of the inner canal side) so that heated water transferred from the non-evaporative area 27 can flow by gravity from an upper canal to a lower canal.

Figure 3:
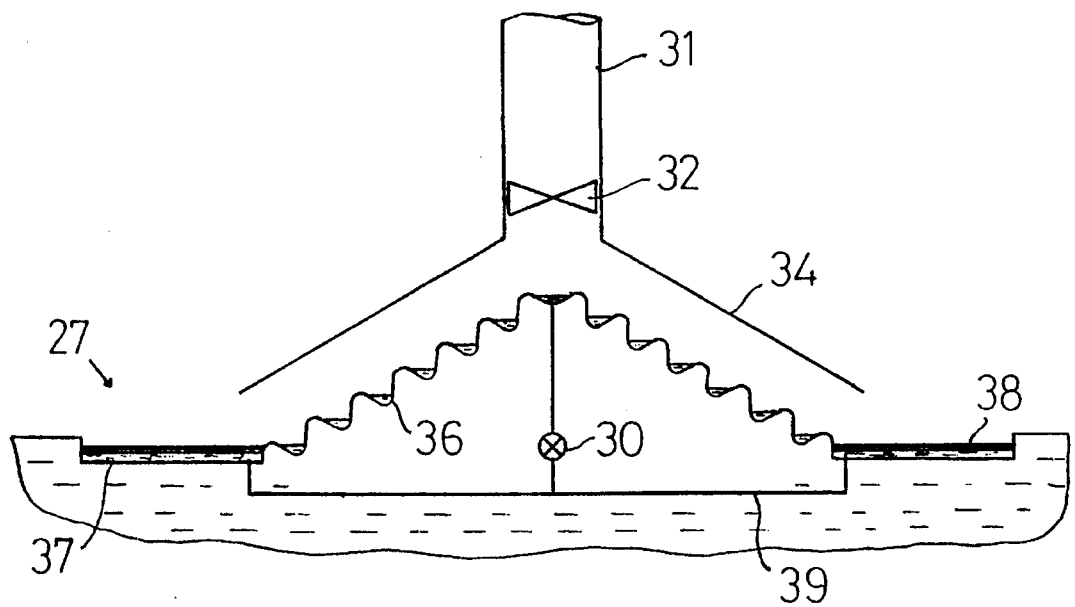
FIG. 3 is a side view, partly in section, of an alternative embodiment.

In this embodiment the flow from an upper canal to a lower canal is through conduits 28, the water ultimately flowing back to the non-evaporative (primary heat absorbtion) area e.g pan 37 (FIG. 3). In an alternative embodiment heated water from the non-evaporative pan or pans is sprayed under pressure (rather than being drip fed) from pipes 24, utilising pump 30, which is fed by pipes 39. In a further alternative embodiment there is only a single water supply pipe 24, which feeds only the topmost canal 29a. The water in canal 29a overflows so as to run as a thin film into the next canal 29b, and so on. Evaporation is likely to occur both from the top water film in the canal and whilst as a thin overflowing film.

In an alternative embodiment the canals can be of short length, to face away from one side only of the chimney 1 or chimney 31 (FIG. 3), but in a further alternative embodiment a single canal but of downwardly spiral form surrounding the chimney is utilised.

In the embodiment of FIG. 3, a chimney 31 of standard construction e.g. of brick or concrete, is installed in the centre of the glass collector roof 34. The roof 34 acts as a secondary heat collector, as well as a cover spaced above the evaporation or heat transfer water surface provided by the canals and overflow surfaces. Standard pressure-staged wind turbines 32 (or other types) are installed at the chimney inlet. Solar radiation heats up the water in the primary solar heat absorber pan 37. Usefully the pan 37 acts also as a heat reservoir, retaining for a substantial period heat energy received during periods of sunlight, though in an alternative but less preferred embodiment the pump 30 or other liquid transfer means (between the pans 37,36) is of a capacity for several water changes in the primary heat absorbtion (non-evaporative) pan 37 each hour.

The solar heat reservoir pan 37 is covered by one or more transparent solar transmitting (polythene or similar material) material sheets 38 adapted to float on the surface of the water, preventing evaporation from the water surface and trapping the transmitted solar hear in the water i.e. manifested as an increase in water temperature. This heated water is pumped into the heat transfer area below roof 34.

In the heat transfer area there is not a surface contact sheet, whereby to encourage evaporation and the consequent release of excess heat energy from the water to the air. Air trapped below the glass collector roof 34 becomes heated. The hot air outflows through the chimney 31, to drive the turbines 32. The turbines produce electricity, usefully for the national grid, by way of conventional generators.

Pan 36 is of generally pyramid form, with external upwardly facing channels, and acts as a heat transfer unit. The pyramid inclination towards the chimney centre acts as an angled flow means again to permit gravity return flow towards pan 37, outwards from the chimney 31 axis, for water recirculation.

The base of the solar heat reservoir or primary heat absorber 37, as well as the base of heat transfer unit or pan 36 is covered by a black membrane, to improve the solar heat absorption and to reduce the heat losses from heated water to the underneath soil or the like. This cover will also prevent leakage of the hot water.

In this embodiment pre-heated water from pan 37 circulates through a pipe network (again acting as the transfer means for heated liquid from the non-evaporative area 27) laid on the banks of the circular canals. Hot water drips on to the bank surface through the holes provided in the pipes 24 (or may be sprayed into the air). The increase of water vapour content in the air is believed likely to reduce the air density, for enhanced flow past blades 32 to increase the power output.

In yet a further embodiment, the non-evaporation sheet 8,38 is replaced by a layer of oil or other liquid, or by a material having the required properties of (i) being less dense than the water in pre-heating pan 7,37; and (ii) being transparent or translucent or being otherwise able to transmit solar heat energy to the water.

In another further embodiment, the invention is carried out on apparatus constructed at sea, or in a lake or other large body of water, using floating troughs and platforms mounted on struts connected to the bed of the sea or other body of water.

I claim:

1. A solar chimney arrangement comprising a chimney to receive fluid originating from a solar heat collector and a turbine to be driven by the fluid, wherein said solar heat collector comprises an evaporative area for containing liquid and a non evaporative area for containing liquid, the non-evaporative area comprising a first cover adapted to inhibit evaporation of a heat-absorbing liquid, the evaporative area comprising a second cover connected to the chimney and adapted to contain vapor evaporating from a liquid in the evaporative area, said second cover being transparent to solar energy and positioned to permit solar energy to pass therethrough and impinge on at least part of the evaporative area, and means to transfer thermal energy from liquid of the non-evaporative area to liquid of the evaporative area.

2. An arrangement according to claim 1 further comprising transfer means to feed heat absorbing liquid from the non-evaporative area into the evaporative area to intermix with liquid in the evaporative area.

3. A solar chimney arrangement comprising a chimney to receive fluid originating from a solar heat collector and a turbine to be driven by the fluid, wherein said solar heat collector comprises an evaporative area for containing liquid and a non-evaporative area for containing liquid, with the non-evaporative area comprising a first cover adapted to inhibit evaporation of a heat-absorbing liquid, and the evaporative area comprising a second cover connected to the chimney and adapted to contain vapor evaporating from a liquid in the evaporative area, said second cover being transparent to solar energy and positioned to permit solar energy to pass therethrough and impinge on at least part of the evaporative area, means to transfer thermal energy from liquid of the non-evaporative area to liquid of the evaporative area, and transfer means to feed heat-absorbing liquid from the non-evaporative area into the evaporative area at a level above liquid in the non-evaporative area, and angled flow means in the evaporative area to effect gravity flow of liquid from the evaporative area to the non-evaporative area.

4. An arrangement according to claim 1, wherein the first cover is adapted to float on top of the liquid in the non-evaporative area, and in which the first cover is comprised of a plurality of layers, the layers being spatially separated by a member of the group consisting of inflated balls, rigid foam and styro-foam balls, struts, and ropes.

5. An arrangement according to claim 1, wherein the second cover extends beyond the evaporative area and has a gap adjacent one of its edges for ambient air to inflow, said gap being connected to the chimney by a chimney inflow opening.

6. An arrangement according to claim 1, wherein the evaporative area and the non-evaporative area comprise one of liquid filled pans and trenches dug into the ground.

7. An arrangement according to claim 6, wherein the pans and trenches are between 2.5 cm and 15 cm deep.

8. An arrangement according to claim 6 wherein the pans and trenches are lined with a heat absorbing material.

9. An arrangement according to claim 1, wherein the non-evaporative area and the evaporative area surround the chimney.

10. An arrangement according to claim 1, wherein the solar heat collector is adapted to increase the moisture content of air above the evaporative area by at least 2%, and to increase the temperature of air above the evaporative area by at least 3° C., over that of surrounding ambient air.

11. A solar chimney arrangement comprising a chimney to receive fluid originating from a solar heat collector and a turbine to be driven by the fluid, wherein said solar heat collector comprises an evaporative area for containing liquid and a non-evaporative area for containing liquid, with the non-evaporative area comprising a first cover adapted to inhibit evaporation of a heat-absorbing liquid and to allow passage of the sun's rays therethrough, and the evaporative area comprising a second cover connected to the chimney and adapted to contain vapor evaporating from a liquid in the evaporative area, said second cover being transparent to solar energy and positioned to permit solar energy to pass therethrough and impinge on at least part of the evaporative area, and means to transfer thermal energy from liquid of the non-evaporative area to liquid of the evaporative area.

\* \* \* \* \*